(12) United States Patent
Anderson et al.

(10) Patent No.: US 9,743,171 B1
(45) Date of Patent: Aug. 22, 2017

(54) METHOD AND APPARATUS FOR DELIVERING AUDIO CONTENT TO A USER

(71) Applicant: Logitech Europe S.A, Lausanne (CH)

(72) Inventors: Jeffrey Anderson, Camas, WA (US); Steve McGarry, Vancouver, WA (US); Michael Joseph Roy, Portland, OR (US); Tom H. Carlson, Jr., Vancouver, WA (US); Alex Danielson, Vancouver, WA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 15/048,892

(22) Filed: Feb. 19, 2016

(51) Int. Cl.
*H04R 1/10* (2006.01)
*G06F 3/16* (2006.01)
*H04R 5/033* (2006.01)

(52) U.S. Cl.
CPC ........... *H04R 1/1041* (2013.01); *G06F 3/165* (2013.01); *H04R 1/1016* (2013.01); *H04R 5/033* (2013.01); *H04R 2420/03* (2013.01)

(58) Field of Classification Search
CPC .. H04R 1/1016; H04R 1/1041; H04R 1/1091; H04R 5/033; H04R 5/0335; H04R 5/04; H04R 5/027; H04R 2420/03; H04R 2420/05; H04R 2420/07
USPC .................... 381/74, 26, 309, 384
See application file for complete search history.

(56) References Cited

U.S. PATENT DOCUMENTS

| | | | | |
|---|---|---|---|---|
| 5,144,678 A * | 9/1992 | Lenz | ............... | H04R 1/1041 381/371 |
| 7,418,103 B2 * | 8/2008 | Sargaison | ........... | H04M 1/6058 381/370 |
| 8,831,242 B2 * | 9/2014 | Brown | ................. | H04R 1/1041 381/74 |
| 9,137,609 B2 * | 9/2015 | Bruss | ................... | H04R 1/1008 |
| 9,467,776 B2 * | 10/2016 | Miller | ................... | H04R 3/005 |
| 2007/0297634 A1 * | 12/2007 | Hansson | ............. | H04M 1/6058 381/384 |
| 2009/0180640 A1 * | 7/2009 | Ogawa | ...................... | H03F 1/08 381/74 |
| 2015/0078573 A1 * | 3/2015 | Nicholson | ................ | H04R 1/10 381/74 |

* cited by examiner

*Primary Examiner* — Xu Mei
(74) *Attorney, Agent, or Firm* — Patterson + Sheridan, LLP (57) ABSTRACT

Embodiments disclosed herein generally relate to method or apparatus that can automatically control the delivery of an audio output to a user. In some embodiments, an audio device that can automatically deliver, halt and/or modify an audio signal based on an impedance measurement made by electrical elements in a headphone or between electrical elements in both headphones of the audio device.

23 Claims, 7 Drawing Sheets

METHOD AND APPARATUS FOR DELIVERING AUDIO CONTENT TO A USER

BACKGROUND

Field

Embodiments disclosed herein generally relate to an audio device that is configured to control the delivery of an audio output to a user.

Description of the Related Art

Audio devices allow users to receive audio content from various media sources, such as computers, tablets, mobile phones, gaming systems or other types of devices. Typical audio devices may include wired headphones or wireless headphones. Some wired or wireless headphones include user inputs, such as manual buttons and switches, allowing the user to power on the headphones and/or control the audio content supplied to the headphones by using these inputs.

While user inputs can enhance the functionality of the headphones, hand-operated inputs, such as manual buttons and switches, require input from a user. Such manual input can be inconvenient to the user. Thus, headphones that can automatically perform operations, such as playing or halting the delivery of audio content, is desired. Some headphones have incorporated mechanical sensors or switches into the headphones to detect when the headphones are on the user's head to control the delivery of the audio content. However, such mechanical sensors are unreliable and suffer from wear and tear due to the repeated motions that occur during use. Other headphones have incorporated non-mechanical sensors, such as infrared sensors. These infrared sensors operate by projecting an infrared beam and then sensing the reflection of the beam to determine if the headphones are positioned correctly on the user. The process of delivering and detecting an infrared beam consumes substantial amounts of power reducing the amount of time that wireless headphones can be used before recharging is needed. Furthermore, the hardware required to project and sense the reflected infrared beam can be difficult to incorporate into a compact headphone design. Thus, there is a need for a more reliable, power-efficient, and compact headphone design that provides the convenience of performing operations, such as playing audio content automatically.

SUMMARY

Embodiments disclosed herein generally relate to an audio device and a method of manufacturing and/or using the audio device. In one embodiment, an audio device is provided including a first headphone comprising a first conductive surface and a first speaker, a second headphone comprising a second conductive surface and a second speaker, and a power supply terminal and a ground terminal. The audio device further includes a first comparator circuit connected to the first conductive surface, wherein the first comparator circuit is configured to generate a first detection signal when a magnitude of an impedance between the first conductive surface and the second conductive surface is less than a first detection threshold value. The audio device further includes a controller configured to alter the delivery of an audio output generated from one or more of the first speaker and the second speaker when the first detection signal is received by the controller.

In another embodiment, an audio device is provided. The audio device includes a power supply terminal, a ground terminal, a first headphone comprising a first conductive surface and a first speaker, and a second headphone comprising a second conductive surface and a second speaker, wherein the second conductive surface is connected to the ground terminal. The audio device further includes a first comparator circuit connected to the first conductive surface. The first comparator circuit includes an amplifier having an input and an output, and a first resistor having a first terminal connected to the power supply terminal and a second terminal connected to the first conductive surface, wherein the input of the amplifier is connected to the second terminal of the first resistor.

In another embodiment, a method for operating an audio device comprising a first headphone and a second headphone is provided. The method includes measuring a magnitude of a first impedance between a first conductive surface of the first headphone and a second conductive surface of the second headphone. Upon determining the first headphone is contacting a first ear of a user and the second headphone is contacting a second ear of the user, an audio output is altered from one or more of the first headphone and the second headphone, wherein determining the first headphone is contacting the first ear of the user and the second headphone is contacting the second ear of the user comprises determining the magnitude of the first impedance is less than a first detection threshold value.

In another embodiment an audio device is provided. The audio device includes a first headphone and a second headphone. Each headphone includes an interface element having an outer conductive surface, an inner conductive surface, and a speaker, and a conductive support, wherein the interface element is releasably coupled to the conductive support. The audio device further includes a power supply terminal and a ground terminal. The audio device further includes a first comparator circuit connected to the outer conductive surface of the first headphone through the conductive support, wherein the first comparator circuit is configured to generate a first detection signal when a magnitude of an impedance between the outer conductive surface of the first headphone and the outer conductive surface of the second headphone is less than a first detection threshold value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments disclosed herein generally relate to a method or apparatus that can automatically control the delivery of an audio output to a user. In some embodiments, an audio device that can automatically deliver, halt and/or modify an audio signal based on an impedance measurement made by electrical elements in a headphone or between electrical elements in both headphones of the audio device.

Figure 1A:
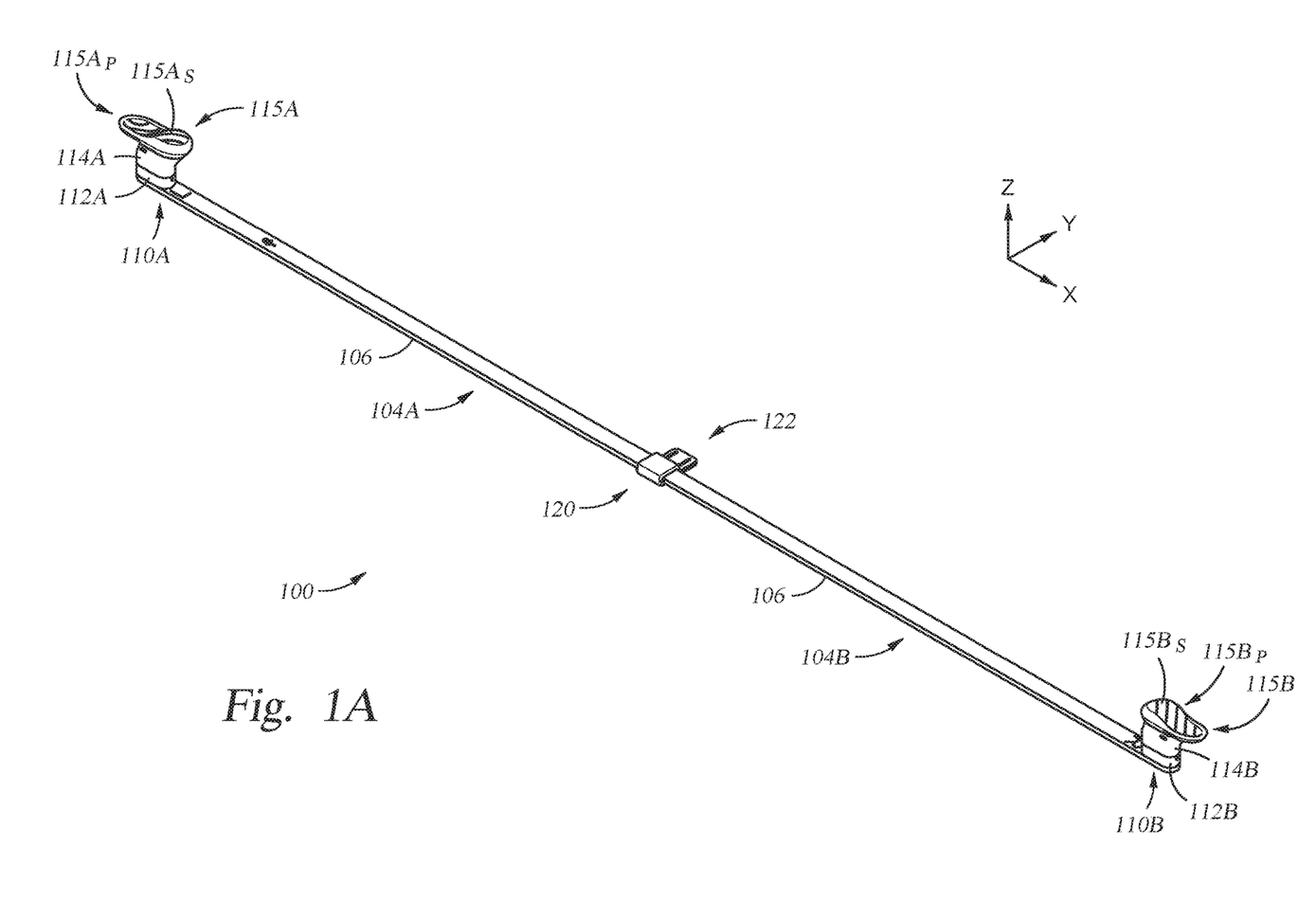
FIG. 1A is an isometric view of an audio device, according to one embodiment.

FIG. 1A is an isometric view of an audio device 100, according to one embodiment. The audio device 100 includes a first headphone 110A and a second headphone 110B. When the audio device 100 is in use, the first headphone 110A and the second headphone 110B may each be positioned on or inserted within a user's ear to deliver audio content to the user. In one example, the first headphone 110A and second headphone 110B are wireless earbuds, earphones, in-ear monitors, or other similar devices. While the audio device 100 is primarily described herein as being a wireless headphone type system, this configuration is not intended to be limiting as to the scope of the disclosure provided herein since other electronic devices that include an interconnecting cable, such as non-wireless headphone or speaker configuration, may also benefit from the disclosure provided herein.

The audio device 100 further includes a first cable assembly 104A, a second cable assembly 104B, and an interconnection assembly 120. The first cable assembly 104A connects the first headphone 110A to the interconnection assembly 120. The second cable assembly 104B connects the second headphone 110B to the interconnection assembly 120. Each cable assembly 104A, 104B may include a respective body 106 formed around components, such as a wiring harness (not shown), for transmitting power and control signals between the interconnection assembly 120 and the respective headphone 110A, 110B. Each body 106 generally includes a molded plastic, elastomer or other similar material that is configured to enclose and/or encapsulate the components within the body 106. In some embodiments, the body 106 may be formed from a flexible thermoset type elastomer or a flexible thermoplastic type elastomer, such as a silicone rubber material.

The interconnection assembly 120 may include a device connector 122 that is adapted to electrically connect electrical components within the audio device 100 to an external device, such as a computer, tablet, cell phone, audio delivery device or other useful electronic device. In one example, the device connector 122 is adapted to be connected to a universal serial bus (USB) port of an external device. When the device connector 122 is connected to the external device, the device connector 122 is adapted to deliver power to one or more batteries in the audio device 100 and/or deliver information (e.g., digital audio data, digital media, etc.) to various components found within the audio device 100. The interconnection assembly 120 may further include a controller 123 (FIG. 1C) that can be used to control operation of the audio device 100, such as when speakers in the headphones 110A, 110B generate sound.

Each headphone 110A, 110B generally further includes a respective connection assembly 112A, 112B, a respective component assembly 114A, 114B and a respective user interface element 115A, 115B. The connection assembly 112A in the first headphone 110A is generally used to join or connect the components in the cable assembly 104A and the interconnection assembly 120 to the various elements in the component assembly 114A. The connection assembly 112B in the second headphone 110B is generally used to join or connect the components in the cable assembly 104B and the interconnection assembly 120 to the various elements in the component assembly 114B. The component assemblies 114A, 114B generally include various structural and electrical components, discussed in further detail below, that are used to provide the desired audio content to the user during operation.

The user interface elements 115A, 115B each generally include a molded or formed component that is adapted to be attached to or positioned on a user during operation. In one example, each user interface element 115A, 115B is an earbud type of component that is adapted to be at least position on a portion of an ear or partially inserted within an ear canal of a user. However, an over-ear headphone or other similar configurations may alternately be used in some cases. Each user interface element 115A, 115B includes a respective electrically conductive portion $115A_P$, $115B_P$. In one embodiment, each conductive portion $115A_P$, $115B_P$ has a respective conductive surface $115A_S$, $115B_S$. In some embodiments, the entire user interface element 115A, 115B can be electrically conductive. Each conductive surface $115A_S$, $115B_S$ is configured to contact at least a portion of a user's ear. The conductive portions $115A_P$ and $115B_P$ of the audio device 100 can be used to measure an impedance between the first conductive surface $115A_S$ and the second conductive surface $115B_S$ to determine when a user is wearing the headphones 110A, 110B, as will be described in further detail below.

The conductive portions $115A_P$, $115B_P$ and the conductive surfaces $115A_s$, $115B_s$, or embodiments including entirely conductive user interface elements 115A, 115B can be formed from a variety of materials, such as an elastomer (e.g., silicone) doped with one or more conductive materials, such as carbon black, carbon fibrils, graphite, graphene, conductive nanoparticles (e.g., carbon nanotubes), carbon fibers coated with a metal (e.g., nickel, silver, gold), glass spheres coated with a metal (e.g., silver, gold), ionomers, silver oxide, iridium tin oxide, tin oxide, antimony doped tin oxide, aluminum, tin, silver, nickel, gold, other metals, or other alloys thereof, and/or combinations thereof. Furthermore, in some embodiments a conductive coating can be applied to the conductive portions $115A_P$, $115B_P$ to form the conductive surfaces $115A_S$, $115B_S$ of the conductive portions $115A_P$, $115B_P$, respectively. The conductive coating may also be applied to an entirely conductive user interface element 115A, 115B. The conductive coating can include, for example, a conductive ink (e.g., a graphene ink or a silver ink), or a paint doped with a conductive material, such as a silicone paint doped with silver oxide or carbon black.

Figure 1B:
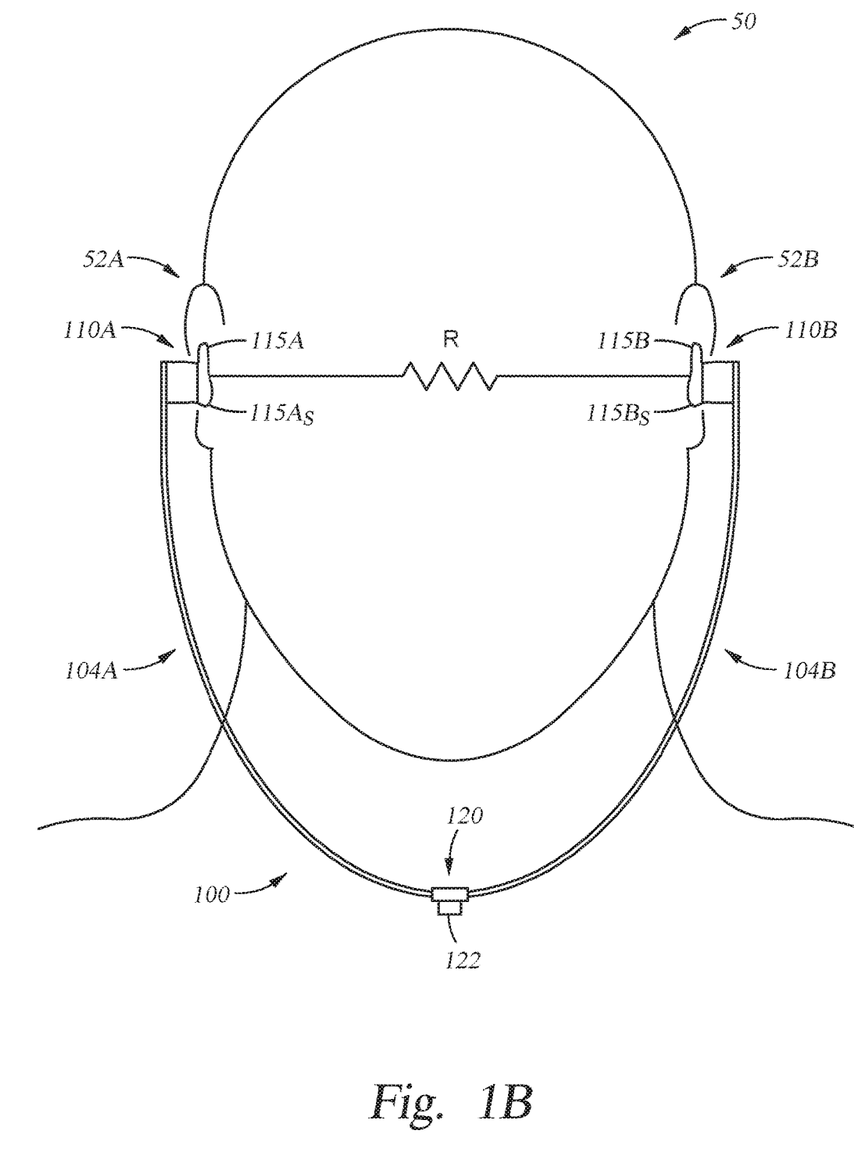
FIG. 1B is a diagram illustrating a user wearing the audio device of FIG. 1A, according to one embodiment.

FIG. 1B is a diagram illustrating a user 50 wearing the audio device 100, according to one embodiment. The user interface element 115A of the first headphone 110A is placed in a first ear 52A of the user 50, and the user interface element 115B of the second headphone 110B is placed in a second ear 52B of the user 50. When the conductive surfaces $115A_S$, $115B_S$ of the respective user interface elements 115A, 115B each contact a portion of the user's skin on or in the user's respective ears 52A, 52B, an impedance R can be measured between the conductive surfaces $115A_S$, $115B_S$. As described in further detail below, the impedance R can be sensed by a comparator circuit (FIG. 1D) in the audio device 100. The impedance R can be used to determine when the user interface elements 115A, 115B of the headphones 110A, 110B are positioned on or in the user's ears 52A, 52B, and the controller 123 (FIG. 1C) can initiate actions, such as altering an audio output from one or more of the headphones 110A, 110B based on hardware and/or software elements found therein. As used herein, to alter an audio output includes starting an audio output, stopping an audio output, and modifying an audio output (e.g., adjusting the volume of audio output or changing a source of audio output) as well as any other changes that can be detected in an audio output signal.

Figure 1C:
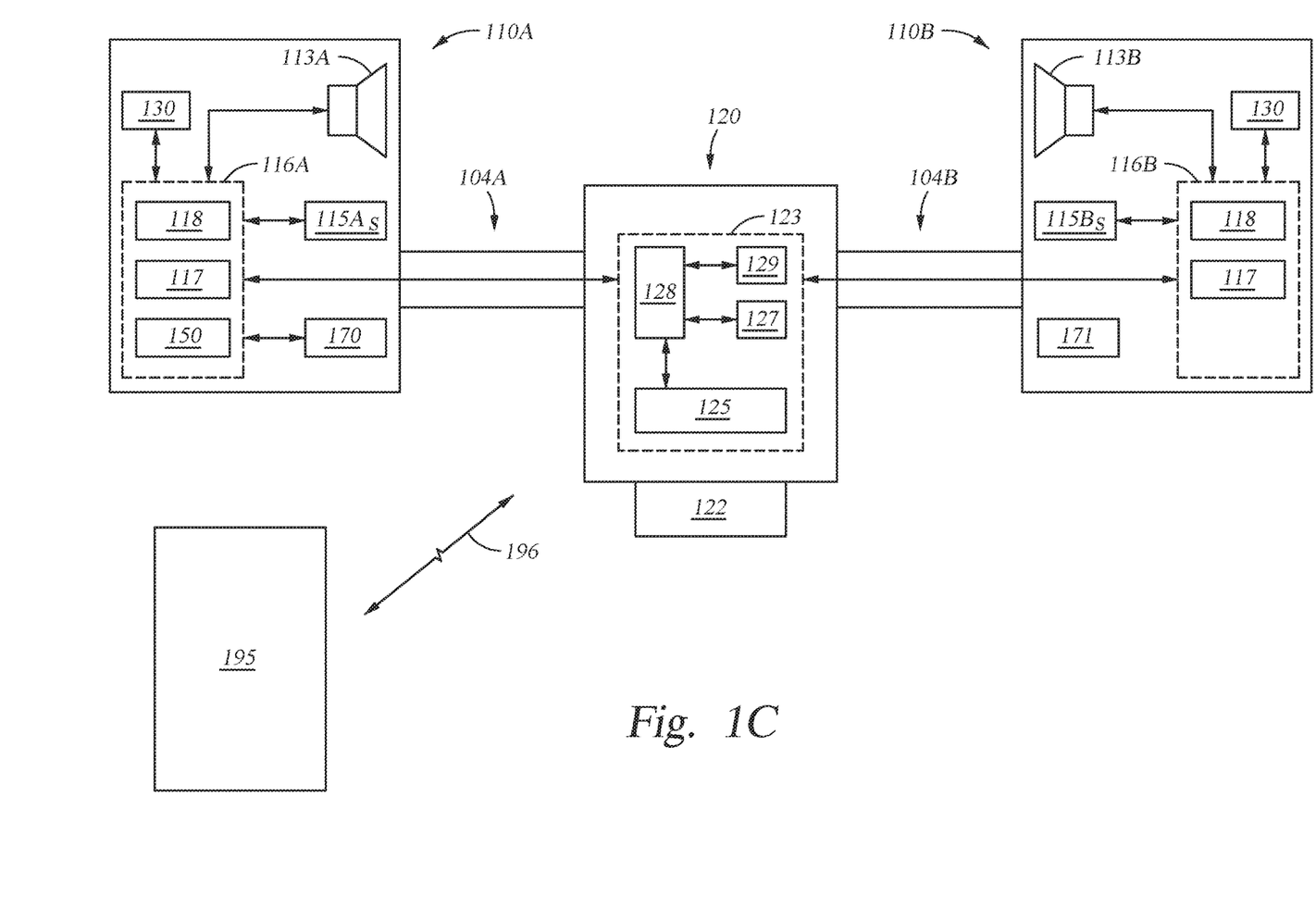
FIG. 1C is a block diagram schematically illustrating various interconnected electronic elements within the audio device shown in FIGS. 1A and 1B, according to one embodiment.

FIG. 1C is a block diagram schematically illustrating various interconnected electronic elements within the audio device 100 shown in FIGS. 1A and 1B, according to one embodiment. The headphones 110A, 110B can each include a respective speaker 113A, 113B, a respective speaker driver assembly 118, a respective power source 130, and a respective printed circuit board (PCB) 116A, 116B. The first speaker 113A and the second speaker 113B can include any conventional audio generating device, such as a device that includes a primary magnet (not shown) and a coil (not shown) that are configured to cooperatively drive a diaphragm (not shown) to generate an audio signal based on a signal sent from the speaker driver assembly 118. The power source 130 may be, for example, a battery that is rechargeable or non-rechargeable. In some embodiments, only one power source may be included, such as a single battery in the first headphone 110A.

Each PCB 116A, 116B can include a transceiver 117 and the speaker driver assembly 118. The transceiver 117 is adapted to receive audio signals from an external device 195 through a wireless communication link 196, and thus can be used to generate an acoustic output by use of the respective speakers 113A, 113B without being physically connected to the external device 195. The external device 195 may be any electronic device capable of transmitting an audio signal by wireless communication. For example, the external device 195 may be a video game console, a personal computer, a tablet computer, a laptop computer, a digital music player, a cell phone (e.g., a smart phone), a stereo system, a television, a video player (e.g., a DVD player, a Blu-ray player), a radio, or other similar device. The external device 195 may include one or more transceivers configured to establish one or more different types of wireless communication links with the transceivers 117, such as a Wi-Fi communication link, a Bluetooth® communication link, an Avnera Audio Link (AAL) or near field communication (NFC) link. In some configurations, the external device 195 is only required to communicate with a transceiver 117 in one of the headphones 110A, 110B, such as the first headphone 110A, which then relays the received information to the electrical components in the second headphone 110B using one or more of the cable assemblies 104A, 104B, and the interconnection assembly 120. Alternatively, in some embodiments a single transceiver may be placed in the interconnection assembly 120, and this transceiver may communicate to each of the headphones 110A, 110B as well as the external device 195.

The speaker driver assembly 118 may include a processing unit (not shown) that is configured to receive signals from the transceiver 117 and transfer the processed audio data (e.g., audio output information) to the respective speaker 113A, 113B. The processing unit may be a hardware unit or combination of hardware units capable of executing software instructions and processing data. For example, the processing unit may be a central processing unit (CPU), a digital signal processor (DSP), an application-specific integrated circuit (ASIC), a combination of such units, and so forth. The speaker driver assembly 118 may also contain one or more components that are configured to drive the respective speaker 113A, 113B so that the audio signal received from the transceiver 117 can be delivered to the user through the speaker 113A, 113B. The speaker driver assembly 118 may further include a memory unit (not shown) that is connected to the processing unit. The memory unit may include any technically feasible type of hardware unit configured to store data, such as a hard disk, a RAM module, a flash memory unit, or a combination of hardware units for storing data. The speaker driver assembly 118 may also further include a software application (not shown) that is stored within the memory unit. The software application may include program codes that may be executed by the processing unit to perform various functionalities associated with the respective headphone 110A, 110B. In some embodiments, the program codes may be used to control the delivery of an audio signal to the speakers 113A, 113B based on input received by the processing unit from the comparator circuit 150 in the audio device 100.

The first PCB 116A can further include a comparator circuit 150 (first comparator circuit) described in further detail below in reference to FIG. 1D. The first comparator circuit 150 can be connected to the first conductive surface $115A_S$ and the second conductive surface $115B_S$ to allow the comparator circuit 150 to sense when the headphones 110A, 110B are placed on or within the user's ears, and then provide the collected information to components within the controller 123.

In some embodiments, the first headphone 110A and/or the second headphone 110B may include one or more additional sensors other than the sensor for sensing when the headphones 110A, 110B are placed on or within the user's ears. For example, the first headphone 110A is shown including a proximity sensor 170. In one embodiment, the proximity sensor 170 can be a Hall effect sensor, and a magnet 171 may be placed in the second headphone 110B to enable the Hall effect sensor to sense when the headphones 110A, 110B are clasped together or at least in a close proximity with each other, such as a distance that is less than a distance between a user's ears, such as less than about 3 inches. Sensing that the headphones 110A, 110B are clasped together or at least in a close proximity with each other can enable the audio device 100 to determine that the audio device 100 is not currently being used allowing the audio device 100 to enter a sleep mode or other power-saving mode, where the audio output level from one or more of the speakers 113A, 113B in the headphones 110A, 110B is reduced or halted all together.

The interconnection assembly 120 may further include a controller 123. The controller 123 may include an input/output (I/O) assembly 125, a transceiver unit 127, a processor 128, and a memory 129. The processor 128 may be a central processing unit (CPU), a digital signal processor (DSP), an application-specific integrated circuit (ASIC), a combination of such units, and so forth. The I/O assembly 125 can include hardware to enable the controller 123 to communicate with, monitor, and/or control external components, such as the device connector 122 and external circuits.

For example, the I/O assembly can include a digital input that is wired to an output of the comparator circuit 150 as described in further detail below to enable the controller 123 to determine when the headphones 110A, 110B are placed in or on the user's ears.

The transceiver unit 127 may include one or more wireless transceivers that are configured to establish one or more different types of wireless communication links with transceivers residing within a computing device (e.g., external device 195). Alternately, the transceiver unit 127 may include one or more wired transceivers that are configured to establish a wired communication links with a transceiver residing within a computing device by use of the pins in the device connector 122.

The memory 129 may include any technically feasible type of hardware unit configured to store data, such as a hard disk, a RAM module, a flash memory unit, or a combination of hardware units for storing data. The memory 129 may also further include one or more software applications (not shown). The one or more software applications may include program codes that perform various functionalities associated with the respective headphone 110A, 110B, such as starting, stopping, or modifying audio being generated by the headphones 110A, 110B or communicating with the external device 195. In one configuration, the one or more software applications are configured to adjust one or more of the activities performed by the headphones 110A, 110B based on information received by one or more sensors (e.g., switches) or the transceiver unit 127. The activities may include, but are not limited to, turning on or off the audio component, putting the audio component in a "sleep" mode, adjusting the audio output parameters (e.g., volume, equalizer settings, etc.) or other useful activities.

In some embodiments, components having similar functions are not duplicated in the interconnection assembly 120 and the headphones 110A, 110B. For example, in embodiments in which the controller 123 includes the transceiver unit 127, the transceivers 117 of the headphones may be omitted. Furthermore, components shown in FIG. 1C as being located in the interconnection assembly 120 or one of the headphones 110A, 110B may be located elsewhere. For example, FIG. 1C shows a power source 130 being located in the first headphone 110A, but in other embodiments the power source 130 may be located in the interconnection assembly 120.

Figure 1D:
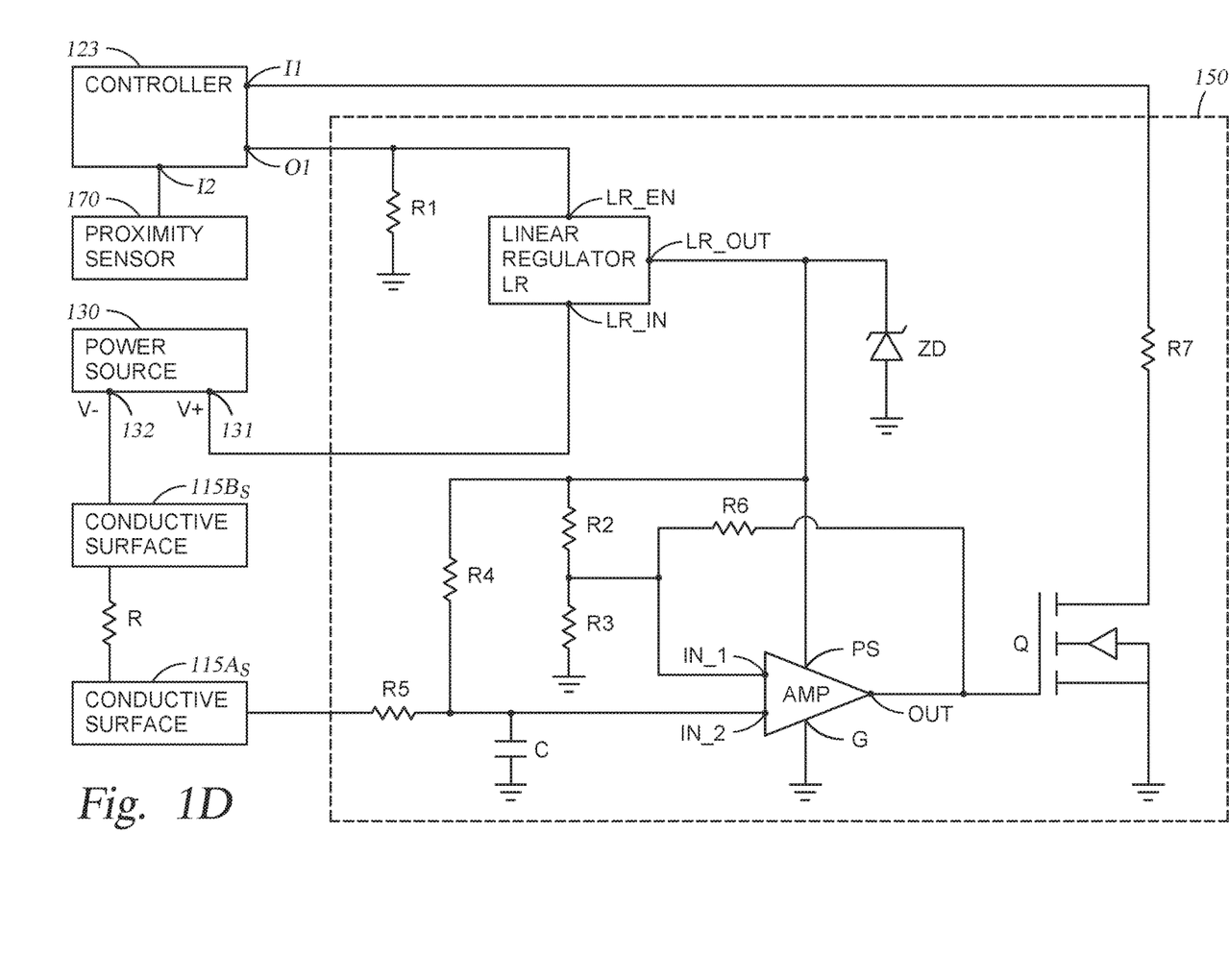
FIG. 1D is a circuit diagram illustrating electrical connections within and between a comparator circuit and other components of the audio device of FIG. 1A, according to one embodiment.

FIG. 1D is a circuit diagram illustrating electrical connections within and between the comparator circuit 150 and other components of the audio device 100, according to one embodiment. The comparator circuit 150 can be used to sense when the headphones 110A, 110B are placed in contact with a portion of a user, such as on or in the user's ears, by measuring the impedance R between the first conductive surface 115A$_S$ and the second conductive surface 115B$_S$.

The comparator circuit 150 can be powered by the power source 130 within the audio device 100, such as within the first headphone 110A. The power source 130 can include a power supply terminal 131 and a ground terminal 132 (also referred to as ground). The comparator circuit 150 can include a linear regulator LR, an amplifier AMP, and a transistor Q (switch). The linear regulator LR can be connected to the power supply terminal 131 to provide a steady voltage to portions of the comparator circuit 150 including the inputs of the amplifier AMP. The gate of the transistor Q can be connected to an output OUT of the amplifier AMP. As described in greater detail below, the comparator circuit 150 can be configured, so that the output OUT from the amplifier AMP can cause the transistor Q to change state when a magnitude of an impedance between the first conductive surface 115A$_S$ and the second conductive surface 115B$_S$ is less than a first detection threshold value (e.g., an impedance value above the high range of impedances that may be measured when the conductive surfaces 115A$_S$, 115B$_S$ are contacting a user's ears). The drain of the transistor Q can be connected to an input I1 of the controller 123, so that the controller 123 can use the state information received from the transistor Q to determine whether a user is wearing the headphones 110A, 110B.

In some embodiments, the comparator circuit 150 is designed so that the first detection threshold impedance value is from about 50 MΩ to about 800 MΩ, such as about 250 MΩ to about 500 MΩ, such as about 400 MΩ. The impedance between a user's first ear and a user's second ear can vary from user to user and can also vary for a given user based on present environmental conditions (e.g., temperature and humidity) and the user's activities (e.g., exercise causing perspiration). Thus, the comparator circuit 150 is designed, so that a first user having a high measured impedance between the user's first ear and second ear (e.g., a non-exercising user in dry conditions) and a second user having a lower impedance between the second user's first ear and second ear (e.g., an exercising user in humid conditions) can both trigger the transistor Q to change state.

An input LR_IN of the linear regular LR can be connected to the power supply terminal 131 of the power source 130. An output LR_OUT of the linear regulator LR provides a steady voltage at the output LR_OUT of the linear regulator LR despite changes in the voltage occurring between the power supply terminal 131 and the ground terminal 132. In some embodiments, a Zener diode ZD is connected between the output LR_OUT of the linear regulator LR and ground. The Zener diode can provide electrostatic discharge protection for the comparator circuit 150 by limiting the voltage supplied by the linear regulator LR to the portions of the comparator circuit 150 including the inputs of the amplifier AMP. The Zener diode ZD includes a cathode connected to the output LR_OUT of the linear regulator LR and an anode connected to the ground. The Zener diode ZD can limit the voltage provided by the output LR_OUT of the linear regulator LR to the Zener voltage of the Zener diode ZD by creating a path to ground when the Zener voltage is exceeded. Although a Zener diode is used here, other voltage and/or current regulating components may also be used.

In some embodiments, the linear regulator LR can include an enable input LR_EN. An output O1 of the controller 123 can be connected to the enable input LR_EN of the linear regulator LR. The controller 123 can determine to enable/ disable the comparator circuit 150 by changing a state of the output O1 based on one or more conditions. For example, in one embodiment the controller 123 can disable the comparator circuit 150 based on the state of the proximity sensor 170 that may be connected to an input I2 of the controller 123. For example, in one embodiment, the proximity sensor 170 can be a Hall effect sensor that can sense when the first headphone 110A is clasped to the second headphone 110B or is at least in close proximity to the second headphone 110B as described above in reference to FIG. 1C.

A first resistor R1 may be connected between enable input LR_EN and the ground terminal 132 to function as a pull-down resistor, so that the enable input LR_EN does not remain in a floating state when the output O1 is in an open state. In some embodiments, the controller 123 may pulse the output O1, so that the comparator circuit 150 is not active all of the time and power may be conserved. For example, in one embodiment, the controller 123 may pulse the output O1 on from about 5 ms to about 200 ms every second, such as about 20 ms to about 50 ms every second, such as a repeating cycle of about 10 ms on and 490 ms off. The controller 123 may further be configured to only read the input I1 when the output O1 is energized, so that the controller 123 is only monitoring the input I1 when the comparator circuit 150 is active and additional power may be conserved.

The amplifier AMP includes a first input IN_1 and a second input IN_2. In some embodiments, the comparator circuit 150 includes a first voltage divider that includes a second resistor R2 and a third resistor R3 to provide a reference voltage to the first input IN_1 of the amplifier AMP. The second resistor R2 can have a first terminal connected to the output LR_OUT of the linear regulator LR and a second terminal connected to first input IN_1 of the amplifier AMP. The third resistor R3 can have a first terminal connected to first input IN_1 of the amplifier AMP and a second terminal connected to ground. Feedback may be provided from the output OUT of the amplifier AMP to the first input of the amplifier AMP through a sixth resistor R6. Power may be supplied to the amplifier AMP by connecting the output LR_OUT to a power supply terminal PS of the amplifier AMP and connecting a ground terminal G of the amplifier AMP to ground.

The second input IN_2 of the amplifier AMP is connected to the first conductive surface 115A$_S$ as part of a second voltage divider that is formed when a conductive path is placed between the first conductive surface 115A$_S$ and the second conductive surface 115B$_S$. The second voltage divider includes a fourth resistor R4 and a fifth resistor R5. The fourth resistor R4 has a first terminal connected to the output LR_OUT of linear regulator LR and a second terminal connected to second input IN_2 of the amplifier AMP. In one embodiment, the fourth resistor R4 can have an impedance from about 25 MΩ to about 500 MΩ, such as from about 75 MΩ to about 150 MΩ, such as about 100 MΩ. The fifth resistor R5 has a first terminal connected to the second input IN_2 of the amplifier AMP and a second terminal connected to the conductive surface 115A$_S$ of the first user interface element 115A. In one embodiment, the fifth resistor R5 can have an impedance from about from about 100 kΩ to about 20 MΩ, such as from about 500 MΩ to about 5 MΩ, such as about 1 MΩ. The connection between the comparator circuit 150 and the first conductive surface is described in greater detail in reference to FIG. 1E.

As described above, the impedance R is formed between the first conductive surface 115A$_S$ and the second conductive surface 115B$_S$ when the first conductive surface 115A$_S$ contacts a user's first ear and the second conductive surface 115B$_S$ contacts the user's second ear. Because the second conductive surface 115B$_S$ is connected to ground, the user's head provides the impedance R allowing the voltage at the second input IN_2 of the amplifier AMP to drop low enough so that the output OUT of the amplifier AMP can cause the transistor Q to change state, such as changing to a state to allow current to flow between the drain and source of the transistor Q. Conversely, when a conductive path is not present between the first conductive surface 115A$_S$ and the second conductive surface 115B$_S$, such as when the headphones are dangling around a user's neck, no current flows through the fourth resistor R4 and the voltage at the second input IN_2 of the amplifier AMP does not drop relative to the voltage provided at the output LR_OUT of the linear regulator LR. A capacitor C may be connected between the second input IN_2 and ground. The capacitor C can help to filter out high frequency signals from effecting the voltage provided at the second input IN_2.

As described above, the output OUT of the amplifier AMP is used to change the state of the transistor Q. In the embodiment shown, the transistor Q is an n-channel MOSFET, but other types of transistor may also be used. Here, the transistor Q has the gate connected to the output OUT of the amplifier AMP, the source is connected to ground, and the drain is connected to an input I1 of the controller 123. In some embodiments, the drain may be connected to the input I1 through a seventh resistor R7. The seventh resistor R7 can limit the current provided through the input I1. In some embodiments, the transistor Q can further include one or voltage suppression components (not shown), such as voltage suppression diodes between the gate and source and between the drain and source to protect the transistor Q and other components from any excessive voltages at the transistor Q.

Although the audio device 100 is generally described as a smart device including the controller 123 having a processor and memory, other embodiments may not include such a controller. For example, a wired headphone device may benefit from including the comparator circuit 150 by connecting the output of the comparator circuit to control a switch that can open or close a connection with the electrical signal sent to the speakers of the headphones, or the output of the comparator circuit could be used to send an input to the external device that is connected to the wired headphone device, so that the external device can start, stop, or modify an audio signal based on the output of the comparator circuit. Such a wired headphone device may receive power from the wired connection to power the comparator circuit. The external device, such as a mobile phone, can then conserve power because the no current is flowing from the audio device through the speakers of the wired headphone device when the output of the comparator circuit indicates that user is not wearing the headphones. Accordingly, used herein the term "controller" can include devices as simple as a switch (e.g., a transistor or electromechanical switch) as well as more complex devices including memory, processors, transceivers, I/O and additional components.

The controller 123 may perform various actions based on the status of the inputs I1 and I2. The input I2 allows the audio device 100 to conserve power when the input I2 indicates that the headphones 110A, 110B are in an inactive position (e.g., clasped together or in close proximity to each other). Despite this benefit, some embodiments may optionally exclude or disable the functionality of the input I2. In such embodiments, the controller 123 may control the operation of the audio device 100 based on the single input I1. The following provide some non-limiting examples of embodiments that use both of the inputs I1, I2.

In one embodiment, when the input I2 indicates that the headphones 110A, 110B are in an inactive position (e.g., clasped together or in close proximity to each other) (State 1), the controller 123 may place the audio device 100 in a sleep mode in which the output O1 is kept in a de-energized state that keeps the comparator circuit 150 in a disabled state through a low input provided to the enable input LR_EN of the linear regulator LR. Furthermore, during State 1, the controller 123 may take other power-saving actions, such as placing the audio device 100 in a non-transmitting mode so that the transceiver 117, 127 either suspend communication or communicate less frequently.

When the input I2 does not indicate that the headphones 110A, 110B are in an inactive position, and the input I1 does not indicate that the user is wearing the headphones (State 2), then the controller 123 can energize or resume energizing the output O1 at least in a pulsed manner, so that the comparator circuit 150 can be activated. Furthermore during State 2, the controller 123 may initiate a communication link between the audio device 100 and one or more external devices 195, so that a communication link is already established when the user places the user interface elements 115A, 115B in contact with the user's ears.

When the input I2 does not indicate that the headphones 110A, 110B are in an inactive position and the input I1 does indicate that the user is wearing the headphones 110A, 110B with the conductive surfaces $115A_S$, $115B_S$ contacting the respective ears of the user (State 3), then the controller 123 can initiate actions, such as beginning to play audio through the headphones 110A, 110B or modifying the audio signal, such as raising the volume. The audio content that the audio device 100 begins to play in State 3 may be, for example, a song from a wireless connected tablet, a phone call from a wireless connected smart phone, or audio transitioned from being played on loud speakers (i.e., a separate device from the audio device 100) to being played through the headphones 110A, 110B.

Upon transitioning from State 3 to State 2, the controller 123 may initiate one or more of the following actions including pausing or stopping audio content that was being played through the headphones 110A, 110B, adjusting the volume, or hanging up a phone call for which the audio was being provided to the headphones 110A, 110B. The controller 123 may also initiate actions based on the duration in the different States 1-3. For example in one embodiment, the controller 123 may send a pause signal to an external device from which audio content was being received at the time of a transition from State 3 to State 2, and then after a delay period during which State 2 is maintained, the controller 123 may send a stop signal to the external device, and then after a longer delay period during which State 2 is maintained, the controller 123 may disconnect the audio device 100 from the external device, for example by terminating a wireless connection to the external device.

Figure 1E:
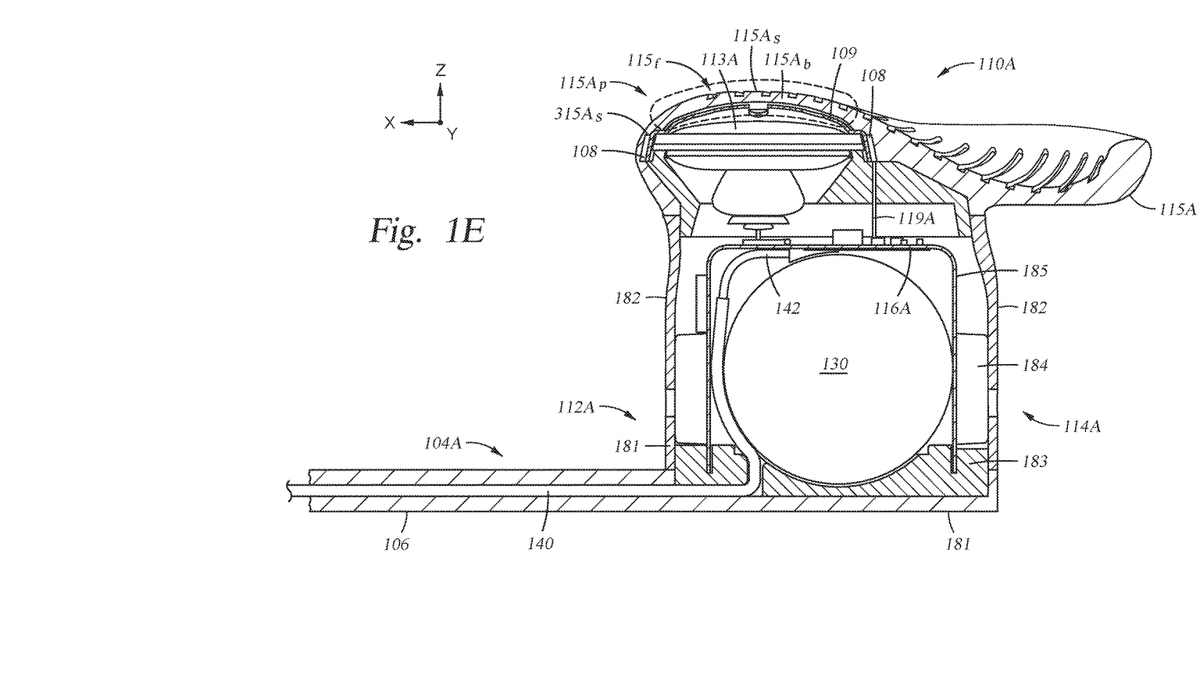
FIG. 1E is a side cross-sectional view of a headphone in the audio device of FIG. 1A.

FIG. 1E is a side cross-sectional view of the first headphone 110A, but may also be representative of the second headphone 110B. The first headphone 110A includes the connection assembly 112A, the component assembly 114A, and the user interface element 115A as described above. The connection assembly 112A includes a plurality of walls 181 that form the exterior structure of the connection assembly 112A. Similarly, the component assembly 114A includes one or more walls 182 that form the exterior structure of the component assembly 114A. In some embodiments, the plurality of walls 181 and the one or more walls 182 can be formed of a non-conductive material (e.g., polymeric material, elastomer, plastic, etc.) so that contact with a user, for example touch by a portion of a user's hand, to these walls 181, 182 does not interfere with the detection process or falsely detect that the headphones 110A, 110B are placed on or in the user's ears. In one embodiment, the conductive surface $115A_S$ is disposed on a first side of the first headphone 110A and a wall $181_1$ of the connection assembly 112A having a non-conductive surface $181_S$ can be disposed on an opposing second side of the headphone 110A. In some embodiments, the connection assembly 112A can include a body 183 disposed in an interior region of the connection assembly 112A to provide structural support for the connection assembly 112A. Similarly, the component assembly 114A can include a body 184 disposed in an interior region of the component assembly 114A to provide structural support for the component assembly 114A.

The first headphone 110A can further include a supporting structure 185 that is connected to the body 183 of the connection assembly 112A and the body 184 of the component assembly 114A. For example, the supporting structure 185 can be embedded in the each of the bodies 183, 184. The supporting structure 185 can be, for example, a sheet metal piece. The supporting structure 185 may be further used to support components, such as the speaker 113A and the PCB 116A. The supporting structure 185 can further be disposed around the power source 130, and in some embodiments, the supporting structure 185 can be connected to the ground of the power source 130.

A wiring harness 140 is routed into the connection assembly 112A from the cable assembly 104A. The wiring harness 140 includes a plurality of wires 142, such as wires for transmitting and receiving power, control, and communication signals. The wiring harness 140 is distributed through the connection assembly 112A and into the component assembly 114A, where the plurality of wires 142 can make electrical connections to different components, such as the power source 130 or the comparator circuit 150 (FIGS. 1C and 1D) on the PCB 116A.

The first conductive portion $115A_P$ can be connected to the first PCB 116A through a first conductor 119A. The first conductor 119A can provide the electrical connection between the first conductive portion $115A_P$ and the comparator circuit 150. The first conductor 119A can be, for example, a metallic wire or bar. In some embodiments, a conductive support 108, such as a conductive housing (e.g., a metallic housing), can surround or at least partially surround the first speaker 113A to enable a large conductive surface area to contact the first conductive surface $115A_s$. In such embodiments, the first conductor 119A can be connected to the conductive support 108, such as being soldered to the conductive support 108 to provide the electrical connection between the conductive portion $115A_P$ and the first PCB 116A. The conductive portion $115A_P$ can include the first conductive surface $115A_S$ (outer conductive surface) for contacting the user's ear and can also include an inner conductive surface $315A_s$ for contacting the conductive support 108. In other embodiments, the first speaker 113A can include a conductive grill 109 (e.g., a metal containing grill) disposed over the speaker 113A that provides a large surface area to contact the inner conductive surface $315A_s$, and the first conductor 119A can be connected to the conductive grill, or the conductive grill may contact the conductive support 108 to which the first conductor is connected. Furthermore, headphones described herein can include more than one conductive surface that can correspondingly include more than one conductive support (e.g. conductive housing) and/or metallic grill to facilitate separate electrical connections between the PCB and the separate conductive surfaces. In some configurations of an interface element, as shown in FIG. 1E, the inner conductive surface $315A_s$ within the conductive portion $115A_p$ is in electrical communication with the first conductive surface $115A_S$ through the body region $115A_b$ of the interface element 115A The conductive path formed between the inner conductive surface $315A_s$ and the first conductive surface $115A_S$ through the body region $115A_b$ may be formed during the interface element manufacturing process. In one example, the body region $115A_b$ may include a dielectric material (e.g., elastomer) that has a concentration of a conductive material that is implanted, molded or diffused therein to form the conductive path between the inner conductive surface $315A_s$ and the first conductive surface $115A_S$. Therefore, in some configurations, each interface element 115A, 115B includes a conductive portion $115A_p$, $115B_p$ that includes a conductive path between an inner conductive surface (e.g., inner conductive surface $315A_s$) and a conductive surface $115A_s$, $115B_s$. In general, since the conductive path is part of the comparator circuit 150, the resistance of the conductive path is typically designed so that it is not significant relative to the impedance measured by the comparator circuit 150. In one example, the resistance of the conductive path is typically be less than about 1 MΩ, or in some cases less than about 100 kΩ, or even in some cases less than about 1 kΩ.

In some embodiments of the interface element 115A, 115B, at least a portion of the conductive surface, which is configured to make contact with a portion of the user, contains one or more surface features that are configured to improve the electrical contact between the conductive surface of the interface elements and the skin of the user. In one example, as illustrated in FIG. 1E, the first conductive surface $115A_S$ includes a plurality of ridges 115f that are sized and positioned to reduce the contact resistance between the first conductive surface $115A_S$ and the surface of the user by increasing the contact stress created between the exposed high points of the formed ridges 115f and the skin of the user when the component assembly 114A is placed in contact with a portion of the user. In some embodiments, the surface features formed on the first conductive surface $115A_S$ may alternately or additionally include an exposed surface that has a higher surface roughness value, such as a high average surface roughness Ra.

Although the structure shown in FIG. 1E is described in relation to the first headphone 110A, the structure can also be representative of the second headphone 110B as the first and second headphones 110A, 110B can include almost all of the same components in some embodiments. For example, the second headphone 110B can similarly include a second conductor (not shown) to provide a connection between the second conductive portion $115B_P$ and the ground of the comparator circuit 150 on the second PCB 116B. In one embodiment, a ground wire from the power source 130 of the first headphone 110A is routed to the second PCB 116B, so that the second conductive surface $115B_s$ can be grounded by the second conductor (not shown) at the second PCB. When a user places the first and second headphones 110A, 110B on the user's ears, a conductive path can be formed from the comparator circuit 150 on the first PCB 116A through the first conductor 119A and conductive support 108 to the first conductive surface $115A_s$, through or along the user's head to the second conductive surface $115B_s$, to the second PCB 116B through the second conductive support (not shown) and second conductor (not shown), and back to the ground of the comparator circuit 150, so that the comparator circuit 150 can sense when the user is wearing the headphones 110A, 110B.

Furthermore, in some embodiments the user interface elements 115A, 115B may be removable from the component assemblies 114A, 114B. For example, the interface elements 115A, 115B can be formed of an elastomeric material (e.g., silicone) that can deform to fit around the conductive support 108, conductive grill 109, or another portion of the headphone 110A, 110B. For example, the interface elements 115A, 115B can be releasably coupled to the respective conductive support 108 allowing the interface elements 115A, 115B to be easily removed and replaced with other interface elements 115A, 115B. In some embodiments, the removable interface element 115A, 115B can include an outer body that includes the conductive portion and include an inner body. The inner body can include an inner surface (e.g., inner conductive surface $315A_s$) that is conductive, and is adapted to make electrical contact with the conductive support 108, conductive grill 109, or another portion of the headphone 110A, 110B. In some embodiments, the outer body can be disposed around the inner body and can deform to ensure sufficient contact (i.e., contact sufficient for allowing an impedance of the user's head to be measured) between the conductive surface of the user element (e.g., first conductive surface $115A_s$, second conductive surface $115B_s$) and the user's ear, while the inner body is used to mechanically attach a portion of the headphone. For example, in one embodiment the inner body can include a slot through which a corresponding protrusion on the portion of the headphone can fit through to make the mechanical attachment between the user interface element and the portion of the headphone. In another embodiment the inner body could include internal or external threads and a portion of the headphone, such as the conductive support, may include corresponding threads so that the interface element can be fastened and make electrical contact to the portion of the headphone.

Making the interface element 115A, 115B removable allows the interface element to be easily replaced. A user may choose to replace the user interface element for functional or aesthetic purposes. For example, user interface elements can have different sizes and/or shapes, so that a user can choose an interface element that is comfortable and makes sufficient contact with the user's ear(s) to enable the audio device (e.g., audio device 100) to sense when the headphone(s) are on or in the user's ear(s). Furthermore, the interface elements may be formed of different materials having different properties, such as hardness and surface roughness, to allow the user choose the interface element that is most comfortable to them.

Figure 2:
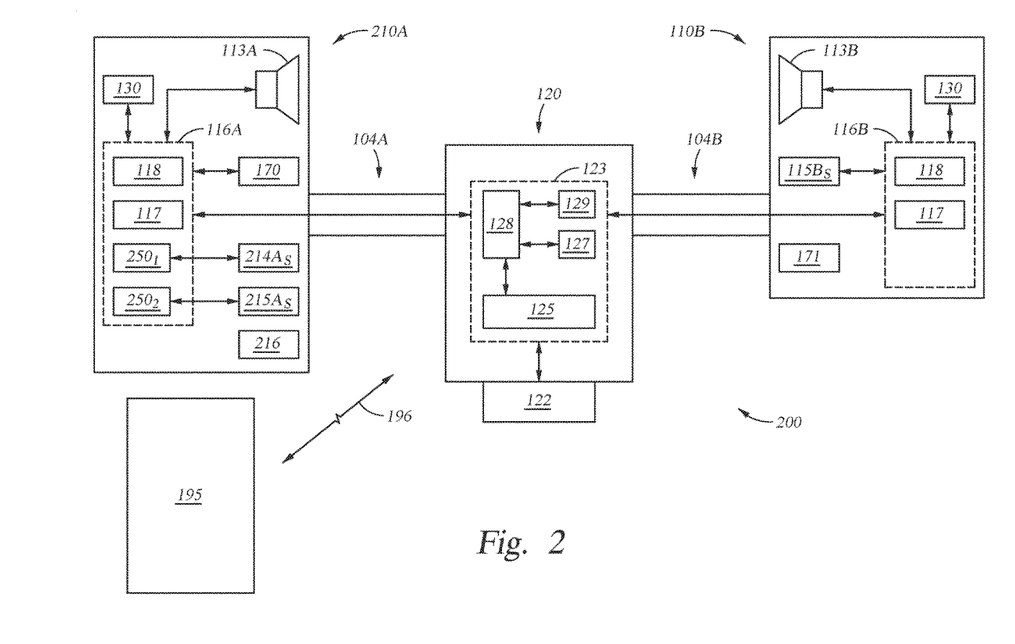
FIG. 2 is a block diagram schematically illustrating various interconnected electronic elements within an audio device, according to another embodiment.

FIG. 2 is a block diagram schematically illustrating various interconnected electronic elements within an audio device 200, according to another embodiment. The audio device 200 is structurally similar to the audio device 100 described in reference to FIGS. 1A-1E except that the audio device 200 includes a first headphone 210A that includes two conductive surfaces $214A_s$, $215A_s$ disposed on separate conductive portions (not shown) of the user interface element (e.g., interface element 115A of FIG. 1A) and two comparator circuits $250_1$, $250_2$ instead of the one conductive surface $115A_s$ and the one comparator circuit 150 of the first headphone 110A. The first conductive surface $214A_s$ is connected to the first comparator circuit $250_1$, and the second conductive surface $215A_s$ (third conductive surface) is connected to the second comparator circuit $250_2$. The second conductive surface $115B_s$ in the second headphone 110B can provide the electrical path to ground through the respective conductive surfaces $214A_s$, $215A_s$ when a conductive path (e.g., a user's head) is placed between the respective conductive surfaces $214A_s$, $215A_s$ and the second conductive surface $115B_s$, so that each comparator circuit $250_1$, $250_2$ can be used to sense when the user is wearing the headphones 210A, 110B. Although the audio device 200 is described as having two separate comparator circuits, in other embodiments that include a first headphone with two conductive surfaces (e.g., conductive surfaces $214A_s$, $215A_s$) a single comparator circuit may be used. For example, in one embodiment, both conductive surfaces (e.g., conductive surfaces $214A_s$, $215A_s$) may be connected in parallel to the same input of an amplifier (e.g., the amplifier AMP described above) in the comparator circuit, and the output of the comparator circuit (e.g., input I1 to the controller 123) may be configured to change state only when both conductive surfaces (e.g., conductive surfaces $214A_s$, $215A_s$) have an electrical path (e.g., user's head) to ground through the conductive surface in the other headphone.

The first headphone 210A includes the two conductive surfaces $214A_s$, $215A_s$ each connected to a respective comparator circuit $250_1$, $250_2$ to improve the accuracy of determining when the user is wearing the headphones of the audio device 200 relative to the accuracy obtained when using only one conductive surface in the first headphone and one comparator circuit. The comparator circuits $250_1$, $250_2$ can be identical to the first comparator circuit 150 with the only electrical differences being the external connections to different conductive surfaces of the first headphone 210A and different I/O of the controller 123.

The first conductive surface $214A_s$ and the second conductive surface $215A_s$ can be located on different portions of the user interface element of the first headphone 210A. The user interface element of the first headphone 210 can be substantially similar to the user interface element 115A of the first headphone 110A except that the user interface element of the first headphone 210 includes two physically separated conductive surfaces $214A_s$, $215A_s$ instead of one conductive surface $115A_s$. The user interface element of the first headphone 210 may further include an insulating surface 216 on an insulating portion (not shown) to electrically isolate the first conductive surface $214A_s$ from the second conductive surface $215A_s$. In one embodiment, the conductive surfaces $214A_s$, $215A_s$ can be located on opposing edges or sides of the user interface element. For example in an embodiment in which the headphones are in-ear headphones (e.g., earbuds) that can fit in a user's ear canal, the first conductive surface $214A_s$ may be positioned to contact a front portion of a user's ear canal while the second conductive surface $215A_s$ may be positioned to contact a back portion of the user's ear canal. As another example in an embodiment in which the headphones over-ear headphones, the first conductive surface $214A_s$ may be positioned to contact a top portion of a user's outer ear while the second conductive surface $215A_s$ may be positioned to contact a lower portion of the user's outer ear.

Using two conductive surfaces $214A_s$, $215A_s$ can help improve the accuracy for determining when the user is wearing the headphones by minimizing the number of false detections, such as when the comparator circuit senses an impedance within the range expected when a user is wearing the headphones, but the user is not actually wearing the headphones. For example, the audio device 100 having one conductive surface $115A_s$ in the first headphone 110A may falsely detect that the user is wearing the headphones when the headphones 110A, 110B are resting on portions of the user's skin or clothing (e.g., damp clothing that presents an impedance similar to a user's head). The controller 123 of the audio device 200 can be programmed to determine that both comparator circuits $250_1$, $250_2$ have detected an impedance within the range of a user's head before making the determination that the user is wearing the headphones. In some embodiments, the controller 123 of the audio device 200 can be configured to switch between requiring one or both of the comparator circuits $250_1$, $250_2$ to give an indication that the user is wearing the headphones. For example, a user with an abnormally shaped ear canal may benefit from having the controller 123 only require that one of the comparator circuits $250_1$, $250_2$ has indicated that the user is wearing the headphones because it may be difficult to ensure good electrical contact to both conductive surfaces $214A_s$, $215A_s$ for such a user.

To further increase the accuracy, each of the headphones (e.g., headphones 110A, 110B of the audio device 100) can be modified, so that each headphone includes two conductive surfaces and a comparator circuit. Each headphone can have one conductive surface connected to the comparator circuit and the other conductive surface of that headphone connected to the ground of the comparator circuit. In this embodiment, the user's ear as opposed to the user's head can provide the conductive path between the two conductive surfaces on the given headphone. The controller can then be programmed to determine that both comparator circuits in the separate headphones have detected an impedance within the range of a user's ear before making the determination that the user is wearing both of the headphones.

This embodiment also allows for the controller to independently determine whether each headphone is in one of the user's ears. The controller can then be configured to initiate control based on transitions from both headphones being worn to only one headphone being worn and vice versa. For example, the controller can be configured to lower the volume of the audio output to the headphones or stop audio output to one of the headphones when the controller determines that one of the headphones has been removed from the user's ear. Similarly, the controller can be configured to raise the volume of the audio output to the headphones or start audio output to one of the headphones when the controller determines that one of the headphones has been placed in the user's ear. Furthermore, this embodiment can be applied to single-ear devices, such as a Bluetooth ear-piece or a hearing aid, allowing automatic operation of the single-ear device based on the impedance measurements between the two conductive surfaces of the single-ear device.

In another embodiment, one or more of the headphones 110A, 110B can include an additional conductive surface at a location other than a surface configured to contact a user's ear during use (e.g., a location other than the user interface element 115A), and this conductive surface can be electrically isolated from any conductive surfaces positioned to contact a user's ear during use of the audio device. For example, in one embodiment the surface $181_S$ (see FIG. 1E) of the wall $181_1$ on the opposing side of the headphone 110A from the conductive surface $115A_s$ can be formed of a conductive material instead of being non-conductive as described above. Here, the additional conductive surface $181_S$ can be electrically isolated from the conductive surface $115A_s$. The conductive surface $181_S$ can be electrically connected to a detection circuit, such as another comparator circuit similar to the comparator circuit 150 described above, to detect when a user touches the conductive surface $181_S$. For example, a detection circuit to detect when a user touches the conductive surface $181_S$ could be formed by using all the components as shown in FIG. 1D and then replacing the conductive surface $115B_S$ in FIG. 1D with the conductive surface $181_S$, where the resistance R would typically be a resistance along the user's body between a user's hand contacting the additional conductive surface $181_S$ and the user's ear contacting the first conductive surface $115A_S$. Furthermore, a corresponding detection circuit can also be connected to an additional conductive surface $181_S$ of the second headphone 110B enabling a user's touch to the additional conductive surface $181_S$ of the second headphone 110B to also be detected.

The detection circuits connected to the corresponding conductive surfaces $181_S$ of the headphones 110A, 110B can be connected to the controller 123 in a similar way to which the comparator circuit 150 was connected to the controller 123 with the input I1 described above enabling the controller 123 to control operation of the audio device based on whether a user's touch is detected on the respective conductive surfaces $181_S$. For example, in one embodiment the controller 123 can alter an audio output of the audio device that includes the conductive surface(s) $181_S$ by, for example, starting an audio output, stopping an audio output, and modifying an audio output (e.g., adjusting the volume of audio output or changing a source of audio output) as well as any other changes that can be detected in an audio output signal. For example, in one embodiment touching the conductive surface $181_S$ of the first headphone 110A can be used to raise the volume being played through the headphones 110A, 110B while touching the conductive surface $181_S$ of the second headphone 110B can be used to lower the volume. In some embodiments, the controller 123 may only alter an audio output based on a touch to one or more of the conductive surfaces $181_S$ when the controller has determined that the headphones 110A, 110B have been placed on or in the user's ears.

Figure 3:
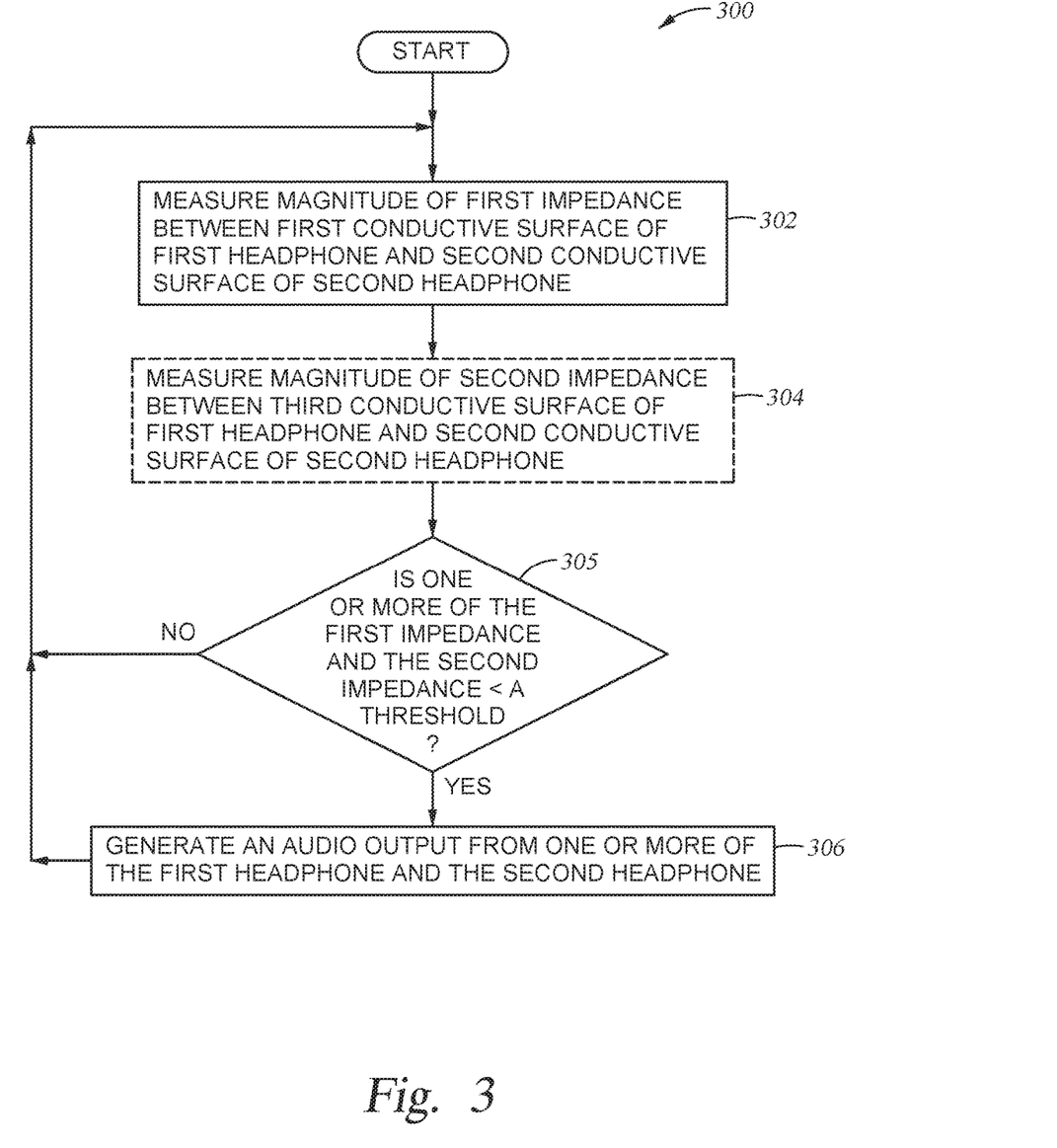
FIG. 3 is a flow diagram of a method for operating the audio device of FIG. 2, according to one embodiment.

FIG. 3 is a flow diagram of a method 300 for operating the audio device 200, according to one embodiment. Referring to FIGS. 1B, 2, and 3, the method 300 is described. At block 302, a magnitude of a first impedance is measured between a first conductive surface $214A_S$ of the first headphone 210A and a second conductive surface $115B_S$ of the second headphone 110B. The magnitude of the first impedance can be measured, for example, by the first comparator circuit $250_1$. The first comparator circuit $250_1$ can send a signal to the controller 123 when the impedance is in an expected impedance value range that is indicative of the first conductive surface $214A_S$ and the second conductive surface $115B_S$ each being in contact with different ears on a user's head or both being in contact with different portions of only one of the user's ears.

At block 304, a magnitude of a second impedance is optionally measured between a second conductive surface $215A_S$ (third conductive surface) of the first headphone 210A and a second conductive surface $115B_S$ of the second headphone 110B. The magnitude of the second impedance can be measured, for example, by the second comparator circuit $250_2$. The second comparator circuit $250_2$ can send a signal to the controller 123 when the impedance is in an expected impedance value range for an impedance through a user's head or across a user's ear.

At block 305 the controller 123 can determine whether the first headphone 210A is contacting a first ear 52A of a user 50 and the second headphone 110B is contacting a second ear 52B of the user 50 by comparing one or more of the magnitude of the first impedance and the magnitude of the second impedance to the threshold value(s). In some embodiments, if one or more of the magnitude of the first impedance and the magnitude of the second impedance are not less than respective threshold values, then the controller 123 continues to monitor magnitudes of these impedances at blocks 302 and 304.

At block 305, the controller 123 can determine that the user is wearing the headphones 210A, 110B using a variety of criteria. For example, in one embodiment, the controller 123 can determine that the user is wearing the headphones 210A, 110B by determining the magnitude of a first impedance is less than a first detection threshold value based on the state of the transistor Q in the comparator circuit $250_1$. The controller 123 may further be configured to determine that the user is wearing the headphones 210A, 110B by determining the magnitude of the first impedance is less than the first detection threshold value for at least a delay period, such as from about 100 ms to about 1 s, such as about 200 ms to about 300 ms. Using a delay period can prevent the controller 123 from initiating actions, such as activating the speakers 113A, 113B when an electrical path is briefly formed between the conductive surfaces 214As, 115Bs, such as when the headphones 210A, 110B may be dangling around a user's neck and bouncing off of the user's skin. Thus, the delay is one way to assist in preventing false detections of the headphones 210A, 110B being on or in the user's ears. Preventing false detections conserves power for when the user is actually using the audio device 200 and also does not irritate the user because there is less chance of sound being generated by the speakers 113A, 113B when the user is not using the headphones 210A, 110B.

In another embodiment, the controller 123 can require that both the first impedance and the second impedance as measured at blocks 302, 304 indicate the first headphone 210A is contacting a first ear 52A of a user 50 and the second headphone 110B is contacting a second ear 52B of the user 50 by determining that the first impedance is less than the first detection threshold and that the second impedance is less than a second detection threshold. In some embodiments, the second detection threshold can have the same value as the first detection threshold.

At block 306, upon determining that one or more of the magnitude of the first impedance and/or the magnitude of the second impedance are less than the threshold value(s), the controller 123 is configured to send a command to generate, alter, or maintain an audio output from one or more of the first headphone 210A and the second headphone 110B. Upon determining that the headphones 210A, 110B are on or in a user's ears, the controller 123 can initiate a variety of actions at block 306. The following provide some non-limiting examples. In one example, the controller 123 can begin playing audio content through the speakers 113A, 113B, communicate to an external smart phone to answer a phone call so that audio content of the phone call can be played through the speakers 113A, 113B, adjust the volume of the audio content being played through the headphones 210A, 110B, or transfer audio content that was being played through loud speakers to being played through the headphones 210A, 110B. Conversely, when the controller 123 determines that one or more of the headphones 210A, 110B have been removed from the user's ears, the controller can send a command to stop playing audio content through the speakers 113A, 113B, communicate to an external smart phone to hang up a phone call, adjust the volume of the audio content being played through the headphones 210A, 110B, or transfer audio content that was being played through the headphones 210A, 110B to being played through loud speakers.

In some embodiments, after completing the process(es) at block 306, the controller 123 can then continue to monitor magnitudes of these impedances at blocks 302 and 304, or in some cases stop the detection process.

All of these operations that can alter the audio content being played through the headphones 210A, 110B can provide convenience to the user by automating the operations based on the status of whether the user has placed the headphones 210A, 110B on or in the user's ears. Furthermore, the embodiments described provide an audio device that can automate these operations in a compact design. For example, forming the surfaces of the user interface elements to be conductive in order to function as part of the comparator circuit to sense when the headphones have been placed in a user's ears does not add any external components to the headphones, such as an infrared transmitter. Furthermore, using the conductive surfaces to sense an impedance between the headphones does not require any moving parts, such as mechanical switches, that will eventually breakdown and require replacement.

While the foregoing is directed to embodiments of the present disclosure, other and further embodiments of the disclosure may be devised without departing from the basic scope thereof, and the scope thereof is determined by the claims that follow.

What is claimed is:

1. An audio device, comprising:
   a first headphone comprising a first conductive surface and a first speaker;
   a second headphone comprising a second conductive surface and a second speaker;
   a first comparator circuit connected to the first conductive surface, wherein the first comparator circuit is configured to generate a first detection signal when a magnitude of an impedance between the first conductive surface and the second conductive surface is less than a first detection threshold value; and
   a controller configured to alter a delivery of an audio output generated from one or more of the first speaker and the second speaker when the first detection signal is received by the controller.

2. The audio device of claim 1, further comprising a power supply terminal and a ground terminal, wherein the second conductive surface is connected to the ground terminal.

3. The audio device of claim 2, wherein the first detection signal is generated by comparing a reference voltage to a detection voltage, wherein the detection voltage is generated between two or more series connected impedances that are connected between the power supply terminal and the ground terminal, and one of the two or more series connected impedances is an impedance formed between the first conductive surface and the second conductive surface.

4. The audio device of claim 1, wherein altering the audio output comprises generating an audio output from one or more of the first speaker and the second speaker when the first detection signal is received by the controller for at least a delay period.

5. The audio device of claim 1, wherein the audio device further comprises a second comparator circuit and the first headphone further comprises a third conductive surface connected to the second comparator circuit, wherein the second comparator circuit is configured to generate a second detection signal when a magnitude of an impedance between the third conductive surface and the second conductive surface is less than a second detection threshold value.

6. The audio device of claim 5, wherein the third conductive surface is electrically isolated from the first conductive surface.

7. The audio device of claim 5, wherein the controller is configured to alter a delivery of the audio output from one or more of the first speaker and the second speaker when the first detection signal and the second detection signal are received by the controller.

8. The audio device of claim 1, wherein
   the first headphone further comprises an additional conductive surface electrically isolated from the first conductive surface,
   the first conductive surface is disposed on a first side of the first headphone, and
   the additional conductive surface is disposed on a second side of the first headphone, the first side opposing the second side.

9. The audio device of claim 8, wherein the additional conductive surface is electrically connected to a detection circuit configured to detect when a user touches the additional conductive surface with an appendage.

10. An audio device comprising:
    a power supply terminal and a ground terminal;
    a first headphone comprising a first conductive surface and a first speaker;
    a second headphone comprising a second conductive surface and a second speaker, wherein the second conductive surface is connected to the ground terminal; and
    a first comparator circuit connected to the first conductive surface, the first comparator circuit comprising:
      an amplifier having a first input and an output; and
      a first resistor having a first terminal connected to the power supply terminal and a second terminal connected to the first conductive surface, wherein the first input of the amplifier is connected to the second terminal of the first resistor.

11. The audio device of claim 10, further comprising a switch connected to the output of the amplifier, wherein the switch is configured to change state when a magnitude of an impedance between the first conductive surface and the second conductive surface is less than a first detection threshold value.

12. The audio device of claim 11, further comprising a controller having an input connected to the switch, the controller configured to alter a generation of audio output from one or more of the first speaker and the second speaker based on the state of the switch.

13. The audio device of claim 10, further comprising a controller having an input, wherein the first comparator circuit is configured to cause the input of the controller to change based on the output of the amplifier.

14. A method for operating an audio device comprising a first headphone and a second headphone, the method comprising:
    measuring a magnitude of a first impedance between a first conductive surface of the first headphone and a second conductive surface of the second headphone; and
    upon determining the first headphone is contacting a first ear of a user and the second headphone is contacting a second ear of the user, altering an audio output from one or more of the first headphone and the second headphone, wherein determining the first headphone is contacting the first ear of the user and the second headphone is contacting the second ear of the user comprises determining the magnitude of the first impedance is less than a first detection threshold value.

15. The method of claim 14, wherein the first detection threshold value is from about 250 MΩ to about 500 MΩ.

16. The method of claim 14, wherein determining the first headphone is contacting the first ear of the user and the second headphone is contacting the second ear of the user further comprises determining that the magnitude of the impedance is less than the first detection threshold value for a delay period.

17. The method of claim 14, further comprising measuring a magnitude of a second impedance between a third conductive surface of the first headphone and the second conductive surface of the second headphone.

18. The method of claim 17, wherein determining the first headphone is contacting the first ear of the user and the second headphone is contacting the second ear of the user further comprises determining that the magnitude of the second impedance is less than a second detection threshold.

19. An audio device, comprising:
a first headphone and a second headphone, wherein the first and second headphones each comprise:
a speaker;
an interface element having an outer conductive surface, that is electrical communication with an inner conductive surface;
a conductive support, wherein the inner conductive surface of the interface element is releasably coupled to the conductive support; and
a first comparator circuit connected to the outer conductive surface of the first headphone through the conductive support, wherein the first comparator circuit is configured to generate a first detection signal when a magnitude of an impedance between the outer conductive surface of the first headphone and the outer conductive surface of the second headphone is less than a first detection threshold value.

20. The audio device of claim 19, further comprising a controller configured to alter a delivery of an audio output generated from one or more of the speaker of the first headphone and the speaker of the second headphone when the first detection signal is received by the controller.

21. The audio device of claim 19, wherein each conductive support is a metallic housing at least partially surrounding the speaker of the headphone.

22. The audio device of claim 19, further comprising a power supply terminal and a ground terminal, wherein the outer conductive surface of the second headphone is connected to the ground terminal through the conductive support of the second headphone.

23. The audio device of claim 19, wherein each interface element comprises an elastomer doped with a conductive material.

* * * * *